US011179975B2

(12) United States Patent
Yasunaga

(10) Patent No.: US 11,179,975 B2
(45) Date of Patent: Nov. 23, 2021

(54) PNEUMATIC TIRE

(71) Applicant: TOYO TIRE & RUBBER CO., LTD., Itami (JP)

(72) Inventor: Toshikazu Yasunaga, Itami (JP)

(73) Assignee: TOYO TIRE CORPORATION, Itami (JP)

(*) Notice: Subject to any disclaimer, the term of this patent is extended or adjusted under 35 U.S.C. 154(b) by 549 days.

(21) Appl. No.: 16/167,768

(22) Filed: Oct. 23, 2018

(65) Prior Publication Data

US 2019/0135045 A1 May 9, 2019

(30) Foreign Application Priority Data

Nov. 8, 2017 (JP) .............................. JP2017-215876

(51) Int. Cl.
| | |
|---|---|
| *B60C 11/13* | (2006.01) |
| *B60C 11/03* | (2006.01) |
| *B60C 11/11* | (2006.01) |
| *B60C 11/12* | (2006.01) |
| *B60C 11/16* | (2006.01) |

(52) U.S. Cl.
CPC ........ *B60C 11/1369* (2013.01); *B60C 11/032* (2013.01); *B60C 11/0302* (2013.01); *B60C 11/0309* (2013.01); *B60C 11/11* (2013.01); *B60C 11/1204* (2013.01); *B60C 11/1384* (2013.01); *B60C 11/1625* (2013.01); *B60C 2011/0358* (2013.01);
(Continued)

(58) Field of Classification Search
CPC .................... B60C 11/1369; B60C 2011/1361
See application file for complete search history.

(56) References Cited

U.S. PATENT DOCUMENTS

| 1,504,694 A * | 8/1924 | Litchfield | ........... B60C 11/1369 |
| | | | 152/209.22 |
| 6,263,933 B1 * | 7/2001 | Baus | ................... B60C 11/0311 |
| | | | 152/209.12 |

(Continued)

FOREIGN PATENT DOCUMENTS

| EP | 3095619 A1 | 11/2016 |
| JP | 05-169922 | * 7/1993 |

(Continued)

OTHER PUBLICATIONS

English machine translation of JP10-035225. (Year: 1998).*

(Continued)

*Primary Examiner* — Robert C Dye
(74) *Attorney, Agent, or Firm* — Westerman, Hattori, Daniels & Adrian, LLP

(57) ABSTRACT

A pneumatic tire includes a plurality of blocks formed by being divided by a longitudinal groove in a tire width direction and divided by a lateral groove in a tire circumferential direction. The blocks include a first block on the inner side in the tire width direction, a second block on the outer side in the tire width direction, a third block adjacent to the first block in the tire circumferential direction, and a fourth block adjacent to the second block in the tire circumferential direction. The pneumatic tire includes a bridge formed in the longitudinal groove and the lateral groove and coupling the first block, the second block, and the third block, or the third block, the fourth block, and the second block.

6 Claims, 2 Drawing Sheets

(52) U.S. Cl.
CPC .............. *B60C 2011/0383* (2013.01); *B60C 2011/1213* (2013.01); *B60C 2011/1254* (2013.01)

(56) References Cited

U.S. PATENT DOCUMENTS

| | | | |
|---|---|---|---|
| 2006/0102267 A1* | 5/2006 | Takahashi | B60C 11/0306 152/209.18 |
| 2006/0108040 A1* | 5/2006 | Miyazaki | B60C 11/11 152/209.15 |
| 2012/0103492 A1 | 5/2012 | Knispel | |
| 2015/0306918 A1 | 10/2015 | Kuwano | |

FOREIGN PATENT DOCUMENTS

| | | | |
|---|---|---|---|
| JP | H09-240220 A | | 9/1997 |
| JP | 10-035225 | * | 2/1998 |
| JP | 2001-219712 | * | 8/2001 |
| JP | 2001-225611 | * | 8/2001 |
| JP | 2005-67407 A | | 3/2005 |
| JP | 2009-006870 A | | 1/2009 |
| JP | 5370639 B2 | | 12/2013 |
| JP | 2014-125109 A | | 7/2014 |

OTHER PUBLICATIONS

Office Action dated Feb. 3, 2021, issued in counterpart DE Application No. 102018126623.5, with English translation. (15 pages).

Office Action dated May 28, 2020, issued in counterpart CN Application No. 201811226660.6, with English translation (16 pages).

Office Action dated Jun. 29, 2021, issued in counterpart JP application No. 2017-215876, with the English machine translation. (6 pages).

* cited by examiner

PNEUMATIC TIRE

CROSS-REFERENCE TO RELATED APPLICATIONS

This application claims priority based on Japanese Patent Application No. 2017-215876 filed on Nov. 8, 2017, the contents of which are incorporated herein by this reference.

BACKGROUND OF THE INVENTION

Technical Field

The present invention relates to a pneumatic tire.

Related Art

Conventionally, a pneumatic tire with a bottom-raised portion being formed on the bottom portion of a lug groove has been known (for example, see Japanese Patent Publication No. 5370639). This bottom-raised portion is designed to reduce the occurrence of uneven wear by making the rigidity of blocks on the center side and the lateral sides in the tire width direction uniform.

However, with regard to the above-described conventional pneumatic tire, there is no mention about enhancing the rigidity between the blocks adjacent in the tire width direction and the tire circumferential direction.

SUMMARY

An object of the present invention is to provide a pneumatic tire capable of improving a traction property by enhancing rigidity between blocks adjacent in tire width direction and tire circumferential direction while securing a ground contact property of the tire by forming longitudinal grooves.

The present invention provides, as a means for solving the above problem, a pneumatic tire including a plurality of blocks formed by being divided by a longitudinal groove in a tire width direction and divided by a lateral groove in a tire circumferential direction, in which the blocks include a first block on an inner side in the tire width direction; a second block on an outer side in the tire width direction; a third block adjacent to the first block in the tire circumferential direction; and a fourth block adjacent to the second block in the tire circumferential direction, and pneumatic tire includes a bridge formed in the longitudinal groove and the lateral groove and coupling the first block, the second block and the third block, or the third block, the fourth block, and the second block.

With this configuration, it is possible to improve the ground contact property by dividing the blocks into the first block and the second block, and the third block and the fourth block in the tire width direction respectively. The traction property of the tire can be improved by increasing the rigidity with coupling of three adjacent blocks in the tire width direction and the tire circumferential direction.

It is preferable that the bridge includes a first coupling portion that couples the first block and the second block or the third block and the fourth block in the longitudinal groove, and a groove portion is formed in the first coupling portion.

With this configuration, it is possible to enhance the rigidity of the first coupling portion and improve the traction property. Moreover, it is possible to increase the snow column shear force during running on a snow surface by forming a two-step recess in the longitudinal groove.

It is preferable that the bridge includes a second coupling portion that couples the first block, the second block, and the third block, or the third block, the fourth block, and the second block in the lateral groove, and a center line of the second coupling portion is inclined with respect to a center line of the first coupling portion.

With this configuration, the rigidity of the bridge itself is enhanced, and the coupled state between the respective blocks is strengthened, thereby improving the traction property.

It is preferable that the longitudinal groove includes a first longitudinal groove that is disposed between the first block and the second block and formed on a center side in the tire width direction, and a second longitudinal groove that is disposed between the third block and the fourth block and formed on a lateral side in the tire width direction, the bridge includes a first bridge that is formed in the first longitudinal groove and the lateral groove and couples the first block, the second block, and the third block, and a second bridge that is formed in the second longitudinal groove and the lateral groove and couples the first block, the second block, and the fourth block, and the second coupling portion of the first bridge and the second coupling portion of the second bridge are arranged in line.

With this configuration, it is possible to enhance the rigidity between the bridges coupled by the second coupling portion and further improve the traction property.

It is preferable that the first block and the third block each have a chamfered portion formed by the longitudinal groove and the lateral groove.

With this configuration, it is possible to enhance the rigidity of the first block and the third block themselves and further improve the traction property.

According to the present invention, the ground contact property can be enhanced by dividing blocks into a plurality of blocks in the tire width direction by longitudinal grooves. In addition, blocks adjacent in the tire width direction and the tire circumferential direction are coupled by bridges, so that it is possible to enhance the rigidity and improve the traction property.

BRIEF DESCRIPTION OF THE DRAWINGS

The foregoing and the other feature of the present invention will become apparent from the following description and drawings of an illustrative embodiment of the invention in which.

DETAILED DESCRIPTION OF EMBODIMENTS

An embodiment of the present invention will be described below with reference to the accompanying drawings. It should be noted that the following description is merely exemplary in nature and is not intended to limit the invention, its applicable objects, and its applications.

Figure 1:
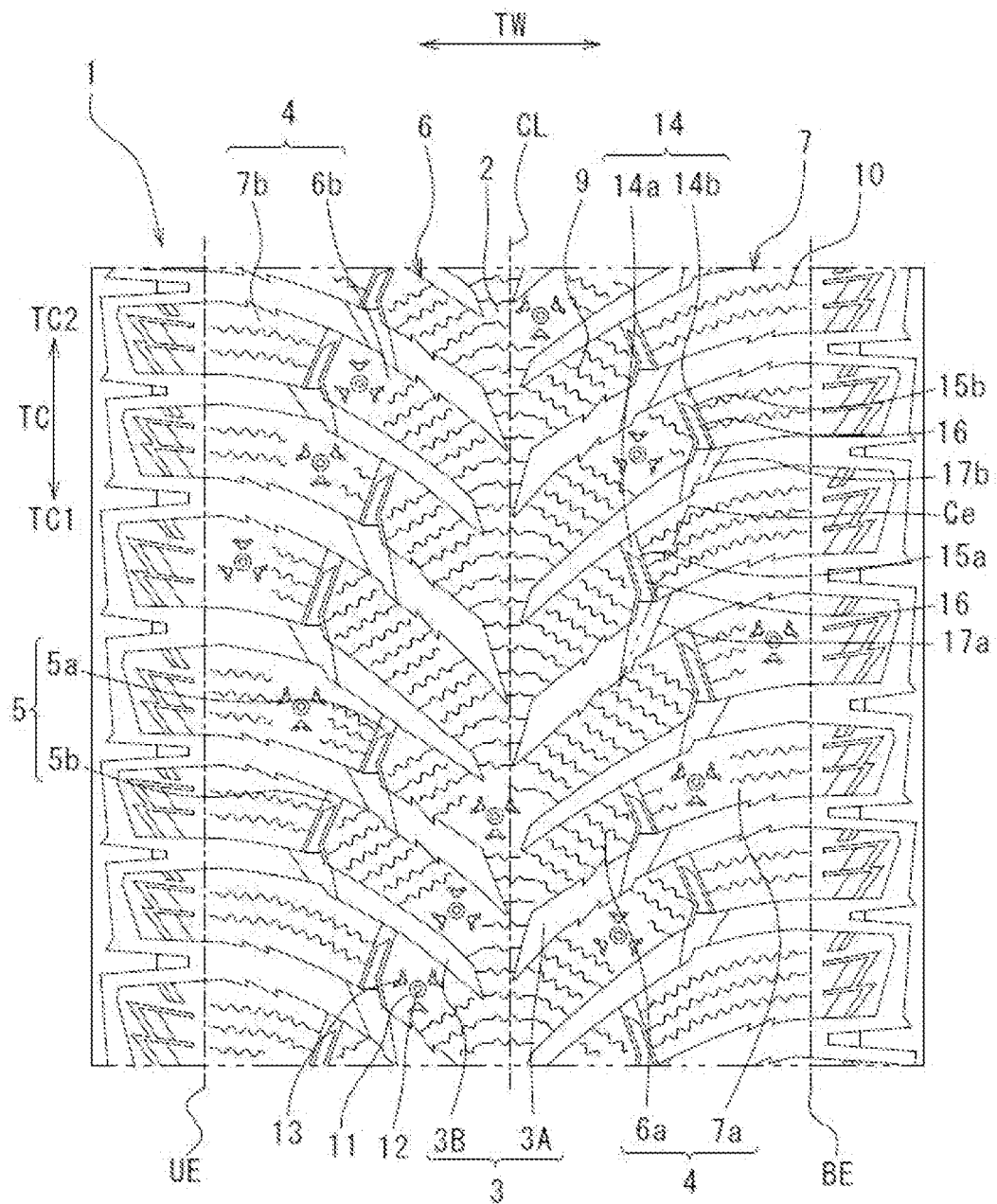
FIG. 1 is a partial development view of a pneumatic tire according to the present embodiment.

FIG. 1 is a partial development view of a tread portion 1 of a pneumatic tire according to the present embodiment. Referring to FIG. 1, reference symbol TC denotes a tire circumferential direction; and TW, a tire width direction. In addition, reference symbol CL denotes the center line (equator line) of the tread portion 1 in the tire width direction.

Further, reference symbols UE and BE respectively denote the ground contact ends of both ends of the tread portion 1 in the tire width direction.

A center rib 2 annularly continuous in the tire circumferential direction on the center line CL is formed on the tread portion 1. On both sides of the center rib 2 in the tire width direction TW, inclined blocks 4 defined by inclined grooves 3 as an example of lateral grooves extend. As a result, the inclined blocks 4 are arranged at predetermined intervals in the tire circumferential direction TC.

The inclined grooves 3 are inclined in one direction of the tire circumferential direction TC, that is, in an opposite direction TC2 of a tire rotational direction TC1 toward the tire width direction TW. The inclined groove 3 includes a wide first inclined groove 3A and a narrow second inclined groove 3B. Portions of both side edges of the first inclined groove 3A are formed in a zigzag shape. The inclined grooves 3 formed on both sides of the center line CL are located with being displaced in the tire circumferential direction TC. The distal end portion of the first inclined groove 3A is substantially located on the center line CL.

A longitudinal groove 5 is formed midway in the inclined block 4. The longitudinal groove 5 is inclined in the tire rotational direction TC1 toward the tire width direction TW and is in substantially orthogonal communication with a first inclined groove 3A and a second inclined groove 3B on both sides. As a result, the inclined block 4 is separated into a center block 6 and a shoulder block 7. In addition, the longitudinal grooves 5 are alternately displaced between the inclined blocks 4 arranged adjacently to each other in the tire circumferential direction on the center side and the lateral sides in the tire width direction. Owing to a first longitudinal groove 5a on the center side, the inclined block 4 is divided into a short first center block 6a and a long first shoulder block 7a. Owing to a second longitudinal groove 5b on the lateral side, the inclined block 4 is divided into a long second center block 6b and a short second shoulder block 7b.

Chamfered portions 8 are formed on corner portions of the first center block 6a and the second center block 6b which are located on the tire rotational direction TC1 side. The chamfered portion 8 is a flat surface extending crossing the inclined groove 3 and the longitudinal groove 5, and the chamfered portion 8 enhances the rigidity of the first center block 6a and the second center block 6b.

In the center rib 2 and the center block 6 following the center rib 2, first sipes 9 are formed radially around the center rib 2 side. Two or three second sipes 10 are formed in the shoulder block 7 along the longitudinal direction of the shoulder block. The sipes 9 and 10 each have a waveform. One end of the first sipe 9 communicates with the inclined groove 3, and the other end of the first sipe 9 terminates in the center rib 2 or the center block 6. One end of the second sipe 10 communicates with the longitudinal groove 5, and the other end of the second sipe 10 terminates in the shoulder block 7. However, a pin region 11 is formed in each of the blocks 6 and 7 as described later, and the sipes 9 and 10 are not formed in this pin region 11.

Figure 2:
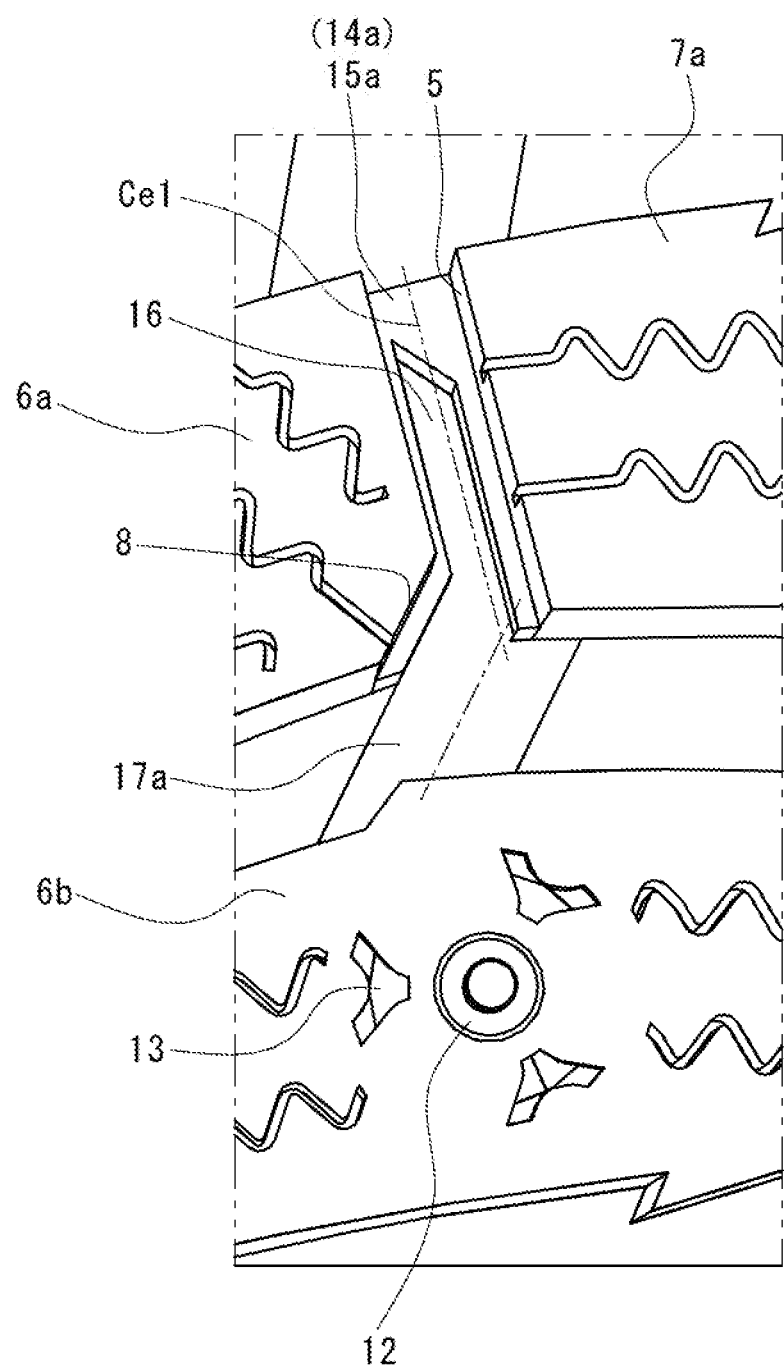
FIG. 2 is a partially enlarged perspective view including a first bridge in FIG. 1.

The pin regions 11 are formed in the center rib 2, the center blocks 6 and the shoulder blocks 7. As shown in FIG. 2, a pin hole (not shown) is formed in the center portion of each pin region 11, and a stud pin 12 is mounted in the pin hole. Three recesses 13 are formed at equal angular intervals in the periphery of each pin hole.

A bridge 14 is formed in the longitudinal groove 5 and the inclined groove 3. The bridge 14 includes a first bridge 14a and a second bridge 14b. The first center block 6a, the first shoulder block 7a, and the second center block 6b are coupled to one another by the first bridge 14a. The second center block 6b, the second shoulder block 7b, and the first shoulder block 7a are coupled to one another by the second bridge 14b.

The first bridge 14a and the second bridge 14b respectively include first coupling portions 15a and 15b for coupling the center block 6 and the shoulder block 7 at the groove bottom portions of the longitudinal grooves 5. Groove portions 16 extending from the inclined groove 3 side and terminating in the longitudinal grooves 5 are formed in the first coupling portions 15a and 15b. The rigidity of the first coupling portions 15a and 15b is increased by the groove portions 16. In addition, the first bridge 14a and the second bridge 14b respectively include second coupling portions 17a and 17b that couple each of the center block 6 and the shoulder block 7 to a corresponding one of the center block 6 and the shoulder block 7 adjacent in the tire circumferential direction at the groove bottom portion of the inclined groove 3. One of the side edges of each of the second coupling portions 17a and 17b extends along the chamfered portion 8 formed on the center block 6 and the other side edge is located closer to the lateral side in the tire width direction than the longitudinal groove 5 so as to be wider than the first coupling part 15. The second coupling portion 17a is coupled to the second center block 6b. The second coupling portion 17b is coupled to the first shoulder block 7a. The first coupling portion 15 and the second coupling portion 17 are bent and continuous with each other. This increases the rigidity of the bridge 14. In addition, the second coupling portion 17a of the first bridge 14a and the second coupling portion 17b of the second bridge 14b are arranged substantially in line (referring to FIG. 1, reference symbol Ce denotes center lines coinciding with each other). This enhances the rigidity between the inclined blocks 4 adjacent in the tire circumferential direction.

The pneumatic tire having the above configuration provides the following effects.

(1) The longitudinal groove 5 is formed midway in the inclined block 4 extending from the center line CL side toward the tire width direction TW so as to separate the block into the center block 6 and the shoulder block 7, so that the rigidity of the block on the ground contact surface side can be suppressed to improve the ground contact property. As a result, braking performance can be enhanced.

(2) Not only the center block 6 and the shoulder block 7 separated by the longitudinal groove 5 but also the center block 6 or the shoulder block 7 adjacent in the tire circumferential direction are coupled by the bridge 14, the rigidity is improved as a whole and the traction performance can be improved.

In particular, the chamfered portion 8 formed on the center block 6 enhances the rigidity of the center block 6. In addition, the rigidity as a whole can be enhanced and the traction performance can be further improved by the groove portions 16 formed in the first coupling portions 15 of the bridges 14, the configuration in which the second coupling portions 17 of the bridges 14 located adjacent to each other in the tire circumferential direction are arranged in line, and the configuration in which the first coupling portions 15 and the second coupling portions 17 of the bridges 14 are continuous with each other in an inclined positional relationship.

What is claimed is:

1. A pneumatic tire comprising blocks formed by being divided by longitudinal grooves in a tire width direction and divided by lateral grooves in a tire circumferential direction comprising a first tire circumferential direction and a second tire circumferential direction that is opposite to the first tire circumferential direction, wherein the blocks include:

first blocks;

second blocks, one of the second blocks being disposed adjacently to one of the first blocks more outwardly in the tire width direction than the one of the first blocks;

third blocks, one of the third blocks being disposed adjacently to the one of the first blocks in the first tire circumferential direction; and fourth blocks, one of the fourth blocks being disposed adjacently to the one of the second blocks in the first tire circumferential direction, wherein each of the first blocks and each of the third blocks are arranged alternately in the tire circumferential direction, wherein each of the second blocks and each of the fourth blocks are arranged alternately in the tire circumferential direction, wherein the pneumatic tire includes bridges formed at locations where the longitudinal grooves and the lateral grooves intersect, one of the bridges coupling the one of the first blocks, the one of the second blocks, and another one of the third blocks that is disposed adjacently to the one of the first blocks in the second tire circumferential direction, or coupling the one of the third block, the one of the fourth block, and the one of the second blocks, wherein each of the bridges include:

a first coupling portion that couples the one of the first blocks and the one of the second blocks, or couples the one of the third blocks and the one of the fourth blocks, in one of the longitudinal grooves; and a second coupling portion that couples the one of the first blocks, the one of the second blocks and the other one of the third blocks, or couples the one of the third blocks, the one of the fourth blocks and the other one of the second blocks, in one of the lateral grooves, wherein the longitudinal grooves include:

first longitudinal grooves, one of the first longitudinal grooves being disposed between the one of the first blocks and the one of the second blocks; and second longitudinal grooves, one of the second longitudinal grooves being disposed between the one of the third blocks and the one of the fourth blocks, and formed more outwardly in the tire width direction than the one of the first longitudinal grooves, wherein the bridges include:

first bridges, one of the first bridges coupling the one of the first blocks, the one of the second blocks and the other one of the third blocks; and second bridges, one of the second bridges coupling the one of the third blocks, the one of the fourth blocks and the one of the second blocks, wherein each of the first bridges and each of the second bridges are arranged alternately in the tire circumferential direction, and wherein the second coupling portion of the one of the first bridges and the second coupling portion of the one of the second bridges are arranged in line in the tire circumferential direction.

2. The pneumatic tire according to claim 1, wherein a groove portion is formed in the first coupling portion.

3. The pneumatic tire according to claim 2, wherein a center line of the second coupling portion is inclined with respect to a center line of the first coupling portion.

4. The pneumatic tire according to claim 1, wherein each of the first blocks and the third blocks has a chamfered portion formed by one of the longitudinal grooves and one of the lateral grooves adjacent to the one of the longitudinal grooves.

5. The pneumatic tire according to claim 2, wherein each of the first blocks and the third blocks has a chamfered portion formed by one of the longitudinal grooves and one of the lateral grooves adjacent to the one of the longitudinal grooves.

6. The pneumatic tire according to claim 3, wherein each of the first blocks and the third blocks has a chamfered portion formed by one of the longitudinal grooves and one of the lateral grooves adjacent to the one of the longitudinal grooves.

* * * * *